United States Patent [19]

Yokayama

[11] Patent Number: 4,477,254
[45] Date of Patent: Oct. 16, 1984

[54] FOLDABLE MAP WITH PRESENT LOCATION INDICATOR AND PAPER REINFORCING

[76] Inventor: Kozutoyo Yokayama, 40-1 Tsukimidai, Kanagawa, Japan

[21] Appl. No.: 450,755

[22] Filed: Dec. 17, 1982

[51] Int. Cl.³ .............................................. G09B 29/10
[52] U.S. Cl. ...................................... 434/153; 40/904; 283/34; 283/35
[58] Field of Search .................... 40/904, 352; 283/34, 283/35; 434/153; 273/176 L

[56] References Cited

U.S. PATENT DOCUMENTS

| | | | |
|---|---|---|---|
| 1,276,657 | 8/1918 | Ibanez | 434/153 |
| 1,534,151 | 4/1925 | Bahsler | 40/904 |
| 1,710,555 | 4/1929 | Tascarella | 40/904 |
| 3,143,363 | 8/1964 | Falk | 283/35 |
| 4,360,346 | 11/1982 | Ehsanipour | 283/34 |

Primary Examiner—Gene Mancene
Assistant Examiner—Cary E. Stone
Attorney, Agent, or Firm—Koda and Androlia

[57] ABSTRACT

A paper foldable map which includes a cover, a map portion, paper reinforcing and a present location indicator with the marker. The cover is a single combined body which includes a front cover side and a back cover side. The paper reinforcing is of an appropriate width and is provided transversely along a center line of the map. The map portion itself is folded in a specific way. First, with the paper reinforcer as the center line and with an appropriate number of cuts made in the upper and lower portions of the map portion, the map portion is folded towards the paper reinforcer by following the steps of inward folding and outward folding with an equal width one after another. Then, the map portion is further folded from its right and left sides opened. An appropriate portion of the back side of the folded map portion is bonded to one side of the cover. The present location indicator provided with the marker fits over both sides of the cover in a manner to be freely slidable in the vertical direction. The marker itself is provided on the present location indicator in a manner to be freely slidable along the horizontal direction.

2 Claims, 9 Drawing Figures

FOLDABLE MAP WITH PRESENT LOCATION INDICATOR AND PAPER REINFORCING

BACKGROUND OF THE INVENTION

1. Field of the Invention

The present invention relates to a foldable map and more particularly to a foldable map provided with a present location indicator and a paper reinforcer.

2. Prior Art

In the past, various types of folding maps, particularly those for use by drivers, have been provided with absolutely no means for accurately showing the point of one's actual presence at the moment when it is determined while sitting in the car, etc. Consequently, in order to find one's present whereabouts, one had to trace the present position in a map with his eyes every time he or she looks at the map and this procedure is repeated many times. Accordingly, it was necessary to confirm the present position at each point of time by checking it anew from the beginning every time one picks up the map for reference. Thus, determining the present position was extremely troublesome and a time consuming task.

Also, if the map was marked with a writing tool in order to eliminate the problems described above, this made it difficult to use the map in later times. Therefore, this was not a good way to avoid the above described problems either.

Furthermore, conventional single paper maps which folded into suitable sizes were defective in another point. That is, repetitive creases of the fold, particularly those located at the center area of the map, tended to be damaged badly, resulting in lower durability of the map.

SUMMARY OF THE INVENTION

The present invention is intended to obviate the above described disadvantages of the prior art.

It is another object of the present invention to provide an improved map that is able to indicate the present position simply and quickly in any section of the map.

It is yet another object of the present invention to provide a map that makes it possible for the user to keep the map section with a marker on it opened. In this way, when the user wants to look up the position on the map the next time, the user can move the marker to the present position at each point of time without going through the problem required by conventional types of maps. Also, when the user keeps the map section opened with the present position indicated, the present position indicator itself serves to prevent the map from closing so that the necessary section of the map can always be maintained in the opened state.

It is yet another object of the present invention to provide a map that is more durable than conventional maps by solving the problem created by folding.

It is still further object of the present invention to provide a durable map through the use of a simple means.

It is still further another object of the present invention to provide a map that does not require a large space as is required by conventional maps by applying a special method of folding.

It is further still another object of the present invention to provide a map which can be easily used in a narrow space which allows the user of the map to determine the relationship of the roads, etc. covering a broad range and to directly see the relationship with one look.

BRIEF DESCRIPTION OF THE DRAWINGS

Foregoing objects and the attendant advantages of the present invention will become readily apparent as the same become better understood by reference to the following detailed description taken in conjunction with the accompanying drawings, wherein.

DETAILED DESCRIPTION OF THE INVENTION

Referring more particularly to the drawings, following is a description of a map in accordance with the teachings of the present invention.

The map 1 is constructed such that it comprises a cover 2 formed as a united body by combining its front cover side and back cover side. On the back face of one side of the cover 2, a reference map portion 3' of a reduced scale is printed. The reference map 3' includes a framed completely indexed chart as well as indexed codes. To the upper end of the inner surface of one side of the cover 2, a map portion 3 is bonded. The map portion 3 is formed of a single sheet of paper whereon a detailed map identical with the foregoing indexed chart but different in size is printed together with the same codes as above. The map portion 3 is folded with a specific method, and after folded, its respective pages are mutually connected at their tops, bottoms, right edges and left edges. As a result, all of the respective pages can be looked at continuously in sequence while keeping the map portion 3 in the folded state. The specific method of folding applied in this invention for bringing about the above described effects is as described below.

Figure 1:
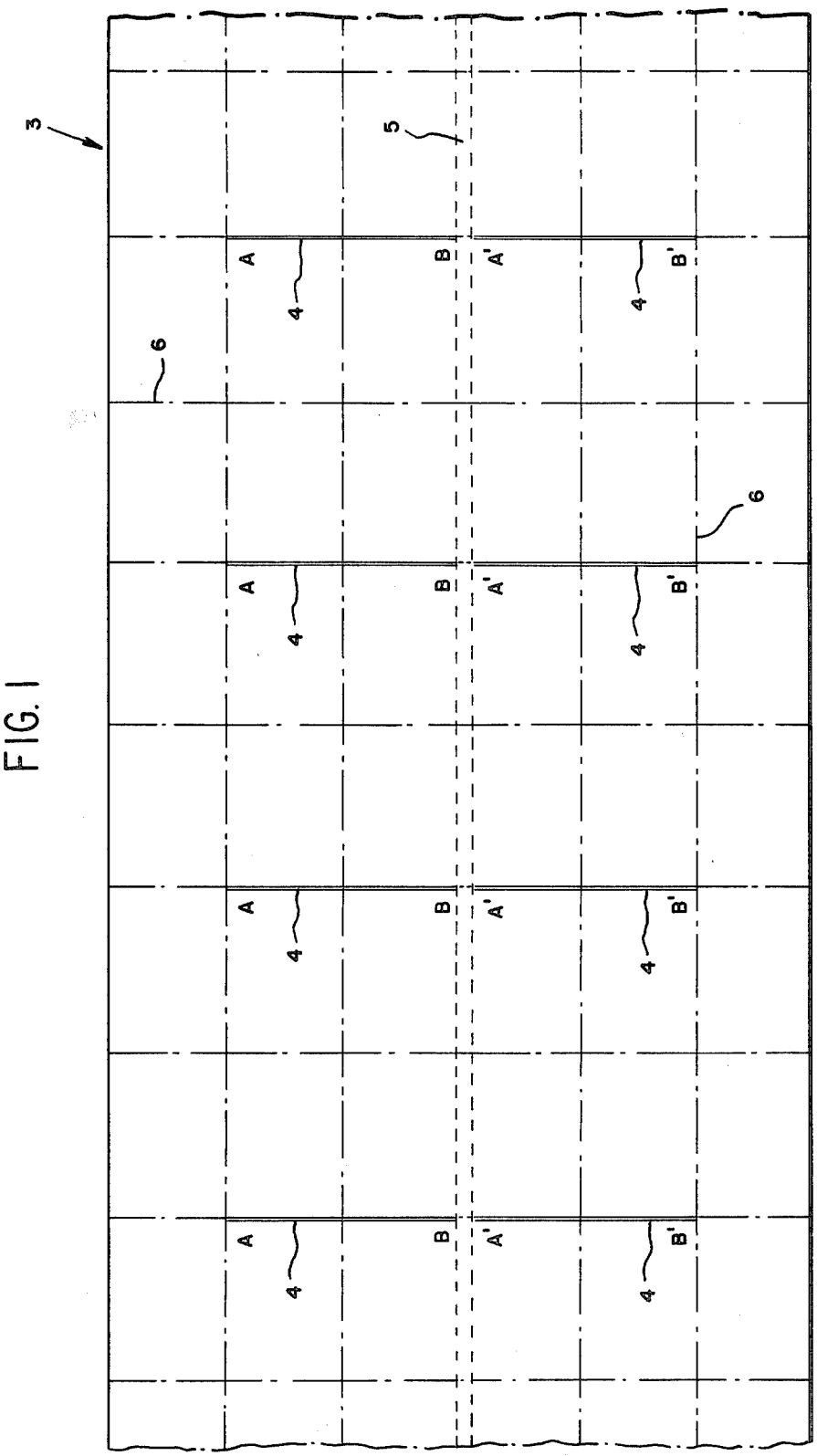
FIG. 1 is a plan view showing a map portion 3 according to the present invention.
Figure 5:
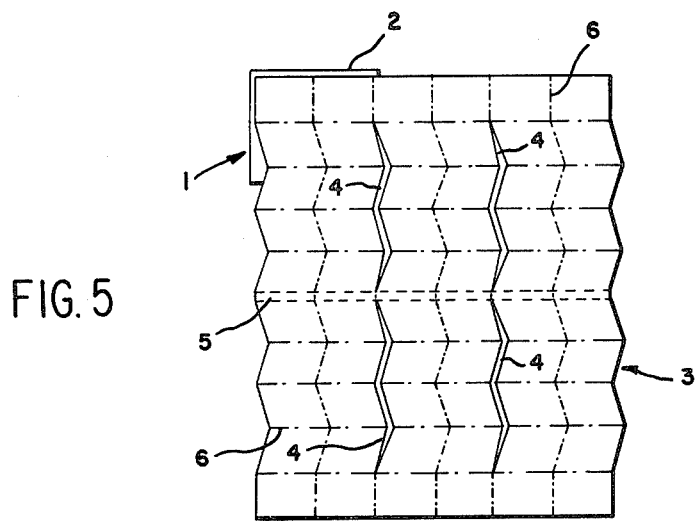
FIG. 5 is a perspective view showing the folding of the map portion 3 from its top and bottom edges.
Figure 6:
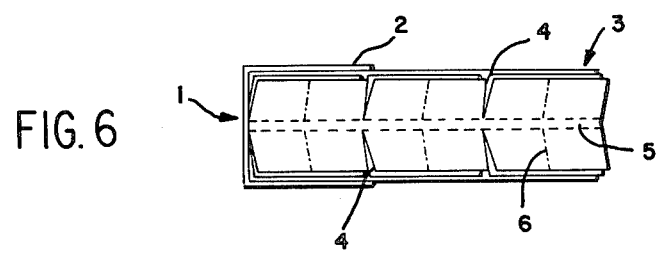
FIG. 6 is a perspective view showing the state wherein the map portion 3 is folded from its top and bottom edges.
Figure 8:
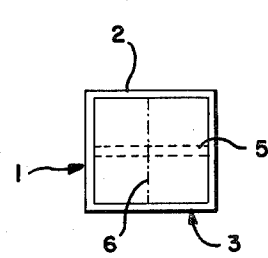
FIG. 8 is a perspective view of the map portion 3 after folding is completed as shown in FIG. 7.
Figure 7:
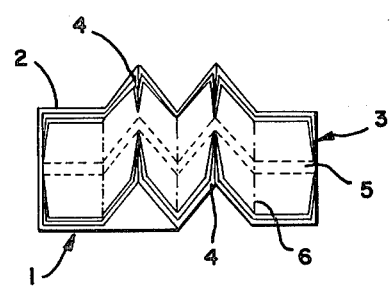
FIG. 7 is a perspective view showing the folding feature of the map portion 3 that is folded as shown in FIG. 6 from its right and left ends.
Figure 9:
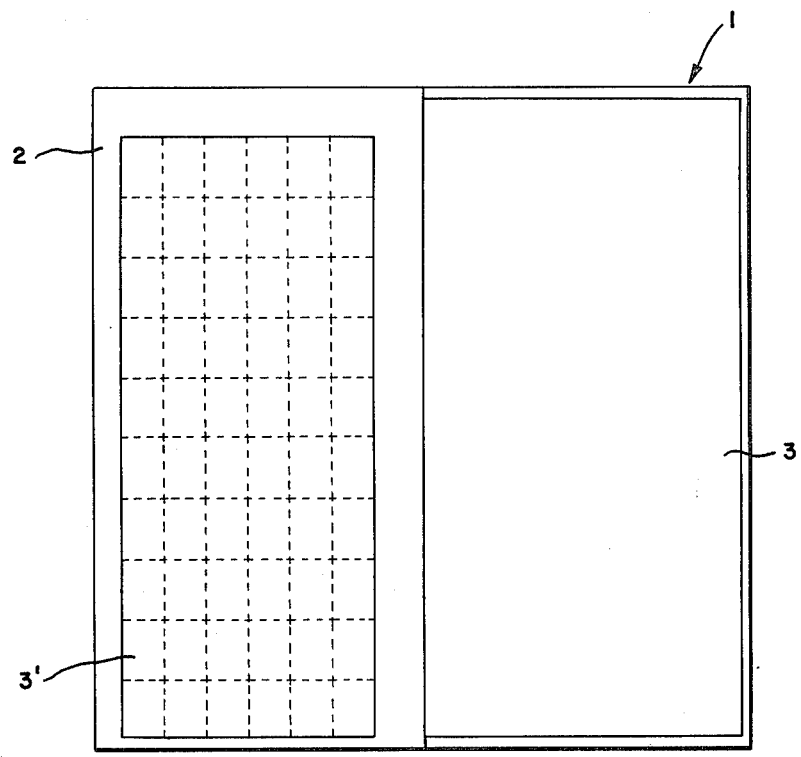
FIG. 9 is a plan view showing a reduced scale reference map 3' printed on the back of the cover of the map according to the present invention.

As shown in FIG. 1, the folding lines 6 are tentatively represented by one-dot chain lines. In the figure, each AB as well as A'B' represent a cut 4 made in the paper when it is in flat state. Along the transverse center of the map paper, a paper reinforcer 5 is provided. The paper reinforcer 5 is of an appropriate width and is provided only along a crease. First, by using the paper reinforcer 5 as a center line, the upper and lower portions of the map portion 3 are folded along the folding lines 6, starting from the upper and lower ends, respectively, by taking the order of inward folding, then outward folding, one after another, as shown in FIG. 5 and FIG. 6. Thereafter, it is further folded as shown in FIGS. 7 and 8. For carrying the map, the map portion 3 can be further folded in half after completely being folded by the above described method so that it can be stored conveniently.

Figure 2:
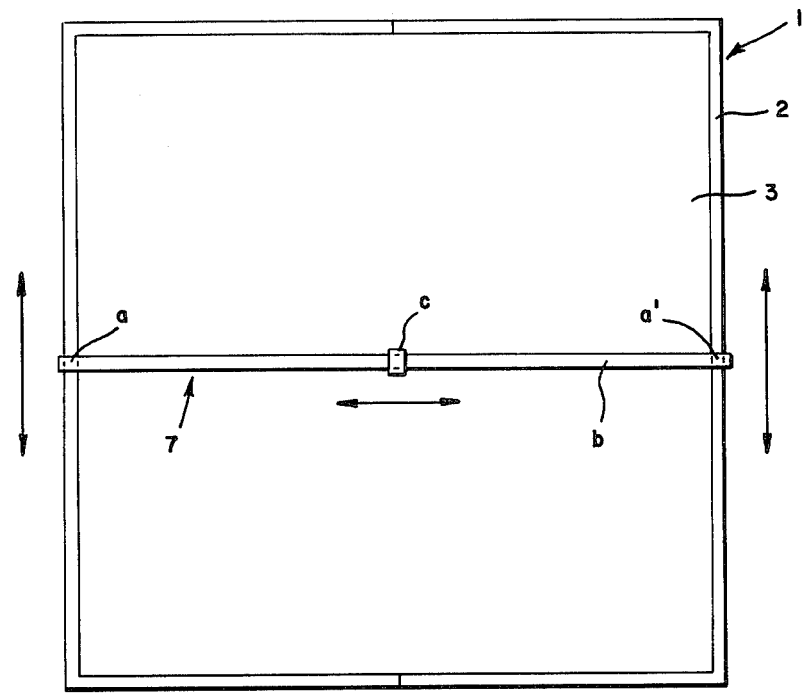
FIG. 2 is a front view of a present location indicator 7 provided for the map shown in FIG. 1.
Figure 3:
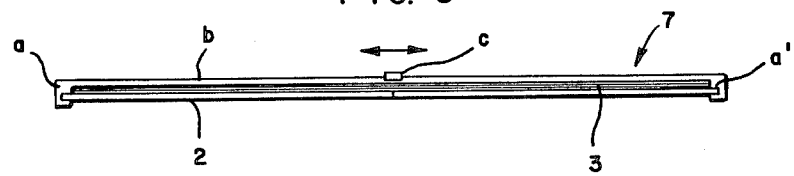
FIG. 3 is a side view thereof.
Figure 4:
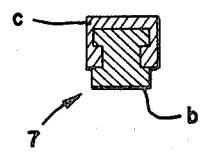
FIG. 4 is a longitudinal profile thereof.

On to the map 1 according to the present invention, that is folded into a convenient size for carriage as described above, the present location indicator 7 is mounted as shown in FIG. 2. The present location indicator 7 is made of a transparent resin material, etc. in accordance with its use. It is mounted as follows. With the map opened for viewing, both edges of the right and left sides of the cover 2 are inserted into clipping portions a and a' provided at the ends of the present location indicator 7. The entire body of the present location indicator 7 is designed to be freely slidable along the vertical direction as shown by the arrows in the figure. Also, on the belt portion b of the present position indicator 7, a marker c that is colored red, etc. and designed to be freely slidable along the horizontal direction as shown by the arrow is mounted in a protruding manner. As a result, it is possible to easily mark any part of the map as the present location.

In the embodiment shown here, the present location indicator 7 is mounted transversely in relation to the entire body of the map 1. However, when it is desired to store the present location indicator 7, it can be taken off the cover 2 by detaching its clipping portions from the edges of the cover and then inserting the clipping portions over the upper and lower ends of the cover. Furthermore, the present location indicator 7 is not necessarily to be mounted on the map transversely and can be mounted vertically against the entire body of the map.

When, as in the embodiment shown in the figures, the present location indicator 7 is mounted transversely, the present location indicator 7 itself solves one of the problems of the conventional maps and hold the necessary page of the map opened all the time.

I claim:

1. A foldable paper map consisting of:
    a sheet of paper having a map printed on at least one side thereof, said sheet of paper having a predetermined number of cuts made in upper and lower portions thereof;
    a paper reinforcer provided transversely along a center line of said sheet of paper on another side of said sheet of paper, said sheet of paper being folded with said paper reinforcer as the center line from the paper sheet's upper and lower ends and towards said center line by inwardly and outwardly folding said paper sheet into equal widths and by folding right and left ends of said paper sheet into equal widths;
    a cover sheet, said folded paper sheet being attached to said cover sheet; and
    a present location indicator which is slidably coupled to said cover sheet so that it slides in a vertical direction and further includes a slidable marker which is horizontally slidable on said present location indicator.

2. A foldable paper map according to claim 1, wherein said present location indicator further holds said map in an unfolded condition.

* * * * *